United States Patent
Noh et al.

(10) Patent No.: US 9,586,419 B2
(45) Date of Patent: Mar. 7, 2017

(54) CAM APPARATUS OF PORTABLE SUBLIMATION PRINTER

(71) Applicant: Prinics Co., Ltd., Suwon-si (KR)

(72) Inventors: Kwang-Ho Noh, Hwaseong-si (KR); Wan-Ha Kim, Suwon-si (KR)

(73) Assignee: PRINICS CO., LTD., Suwon-si (KR)

( * ) Notice: Subject to any disclaimer, the term of this patent is extended or adjusted under 35 U.S.C. 154(b) by 0 days.

(21) Appl. No.: 15/036,720

(22) PCT Filed: Aug. 26, 2014

(86) PCT No.: PCT/KR2014/007935
§ 371 (c)(1),
(2) Date: May 13, 2016

(87) PCT Pub. No.: WO2015/072654
PCT Pub. Date: May 21, 2015

(65) Prior Publication Data
US 2016/0263916 A1    Sep. 15, 2016

(30) Foreign Application Priority Data

Nov. 14, 2013  (KR) .................. 10-2013-0138536

(51) Int. Cl.
*B41J 2/15* (2006.01)
*B41J 11/14* (2006.01)
*B41J 3/36* (2006.01)
*F16H 1/00* (2006.01)
*B41M 5/26* (2006.01)
*B41J 2/32* (2006.01)

(52) U.S. Cl.
CPC ................. *B41J 11/14* (2013.01); *B41J 2/32* (2013.01); *B41J 3/36* (2013.01); *B41M 5/26* (2013.01); *F16H 1/00* (2013.01)

(58) Field of Classification Search
CPC ... B41J 15/04; B41J 11/04; B41J 11/06; B41J 11/08
See application file for complete search history.

(56) References Cited

U.S. PATENT DOCUMENTS 8,109,585 B2 * 2/2012 Iwakura ................. B41J 25/308
347/37
8,727,468 B2 * 5/2014 Iwakura ................. B41J 25/308
347/8
2009/0243192 A1   10/2009 Okamoto

FOREIGN PATENT DOCUMENTS

JP    2002-331720 A    11/2002
JP    2009-119856 A     6/2009
KR    1020050121431 A  12/2005

* cited by examiner

Primary Examiner — Lamson Nguyen
(74) Attorney, Agent, or Firm — Goldilocks Zone IP Law

(57) ABSTRACT

The present invention relates to a cam apparatus of a portable sublimation printer, which can simultaneously implement platen roller up/down and paper pickup roller up/down operations with one cam in a portable sublimation printer, and can constitute a thin and light portable sublimation printer.

13 Claims, 6 Drawing Sheets

CAM APPARATUS OF PORTABLE SUBLIMATION PRINTER

CROSS REFERENCE TO RELATED PATENT APPLICATIONS

This application claims the benefit under 35 U.S.C. Section 371, of PCT International Application No. PCT/KR2014/007935, filed Aug. 26, 2014, which claimed priority to Korean Patent Application No. 10-2013-0138536, filed Nov. 14, 2013, the disclosures of which are hereby incorporated by the references.

TECHNICAL FIELD

The present invention relates to a cam apparatus of a portable sublimation printer, which can simultaneously implement platen roller up/down and paper pickup roller up/down operations with a single cam in a portable sublimation printer, and can constitute a thin and light portable sublimation printer.

BACKGROUND ART

Recently, many people take photographs of events or daily life with their smartphones according to the rapid spread of smartphones.

However, in general, printers have been installed and used in offices or at home and most of the printers are monochrome printers. Even though people have color printers in their offices or at home, it is not possible to print photographs of high quality with the color printers. Therefore, in order to print the photographs taken by smartphones, the photographs have to be outputted in professional photo printing studios.

For this reason, a portable sublimation printer capable of communicating with a portable smartphone wirelessly or through a wire and instantly printing the photographs taken by the smartphone with high quality has been gradually developed and diffused.

A sublimation printer includes a thermal recording head for sequentially printing a printing paper with three colors of yellow Y, magenta M and cyan C, thereby recording the images of photographs on the printing paper with high quality.

Herein, the up/down operations of a paper pickup roller for moving the printing paper and the up/down operations of a platen roller for bringing the printing paper into contact with the thermal recording head have to be carried out, wherein the paper pickup roller and the platen roller operate in association with the operations of each other.

Therefore, a prior art cam device for driving the up/down operations of the paper pickup roller and the up/down operations of the platen roller has a disadvantage that the configuration of the cam device for controlling the up/down operations of the paper pickup roller and the platen roller by using a cam is much complicated such that the thickness of a portable printer becomes thick and the weight thereof becomes increased.

There has been suggested a "printer using a roll type recording medium" in Korean Patent Application No. 10-2005-77076 in order to solve the problem in the prior art. However, this prior art has still disadvantages that it is difficult to form a thin printer since a motor and a cam device are provided to the side surfaces of a printer, and a cam pin is likely to be bent, generating defects, since the function of cutting a paper and the function of moving a platen roller in the up/down directions are carried out by the single cam pin.

DISCLOSURE

Technical Problem

Accordingly, the present invention has been made in an effort to solve the above-mentioned problems occurring in the prior arts, and it is an objective of the present invention to provide a cam apparatus, which can simultaneously implement platen roller up/down operations and paper pickup roller up/down operations with a single cam, and can constitute a thin and light portable sublimation printer.

Technical Solution

To achieve the above objectives, the present invention provides a cam apparatus of a portable sublimation printer, comprising: a body formed in a circular plate shape and coupled to a cam shaft on the inner surface of a frame of a printer so as to make contact with the frame; a gear formed on the outer side of the upper surface of the body, which is formed in a circular plate shape; a platen cam upwardly protruding from the upper surface of the body, which is formed in a circular plate shape, and making contact with a platen bracket so as to move the platen bracket in the up and down directions; a pickup roller cam upwardly protruding from the upper surface of the body, which is formed in circular plate shape, and moving a pickup roller bracket in the up and down directions; and a geared motor engaged with a gear of a cam at one side of the cam so as to drive the cam.

Herein, the gear formed on the outer side end of the cam body is formed in the shape of a bevel gear and the geared motor has a gear formed in the shape of a bevel gear such that the gear of the geared motor is engaged with the gear of the cam.

Further, the gear is formed on the outer side end of the body in the range of a semicircle with respect to the cam shaft, and the platen cam is formed on the remaining portion of the outer side end of the body, on which the gear is not formed.

In addition, the platen cam is formed of three-level height, in which the height gradually increases in the sequence of a platen initial section, a platen half-up section and a platen full-up section.

Further, the pickup roller cam has a pickup roller descending part, which is protruded upwardly from the body of the cam, and a pickup roller ascending part, which is formed in the shape of a "V"-shaped groove on the pickup roller descending part.

Meanwhile, the pickup roller bracket has a guide, which is formed to be protruded in the cam direction, and the guide has a bottom surface formed in an arc shape.

The geared motor incorporates a reducer.

In addition, the geared motor has a rotation amount recognition code.

Further, the pickup roller ascending part is formed on a portion, which faces the platen initial section of the platen cam with respect to the cam shaft.

Advantageous Effects

The cam apparatus of a portable sublimation printer, according to the present invention, configured as above, can control the up/down operations of the platen roller and the paper pickup roller by a single cam and smoothly drive the cam by the motor in a small size by distributing a load, which is generated during the operation of the cam and thus transmitted to the cam, to the frame of the printer.

Further, the cam is formed in a circular plate shape and the motor for driving the cam is engaged in a bevel gear shape with the gear formed on the outer surface of the cam so as to drive the cam such that the cam can be driven with small force and the operations of the cam can be accurately controlled since the load transmitted to the cam is not likely to be transmitted to a motor shaft.

In addition, the cam is formed to be thin into a circular plate shape and the motor for driving the cam is mounted on a side portion of the cam such that a thin and lightweight portable printer can be manufactured.

Figure 1:
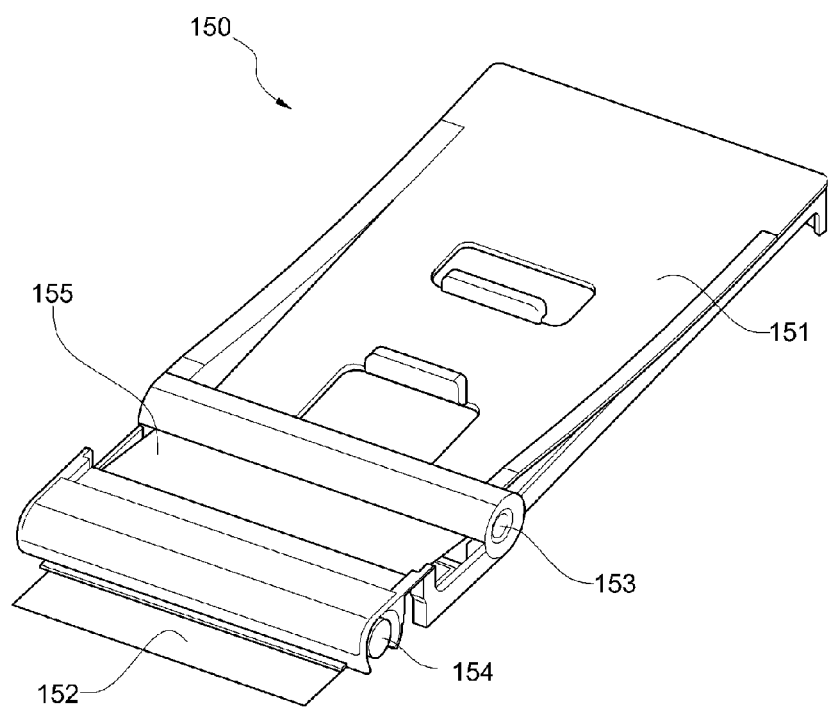
FIG. 1 is a perspective view for illustrating a cartridge mounted on a sublimation printer.

[Explanation of essential reference numerals in drawings]

| | |
|---|---|
| 101: frame | 102: shaft |
| 103: pickup roller bracket | 104: paper pickup roller |
| 105: guide | 106: platen bracket |
| 107: platen | 108: capstan |
| 109: pinch roller | 110: thermal recording head |
| 111: geared motor | |
| 112: rotation amount recognition code | |
| 113: sensor | 150: cartridge |
| 151: paper receiving case | 152: printing paper |
| 153: supply reel | 154: winding reel |
| 155: ribbon | 200: cam |
| 201: body | 202: cam shaft |
| 203: gear | |
| 204: pickup roller ascending part | |
| 205: pickup roller descending part | |
| 206: pickup roller cam | |
| 207: platen initial section | |
| 208: platen half-up section | |
| 209: platen full-up section | |
| 210: platen cam | |
| 211: stopper | |
| 212: rotation amount recognition code | |

MODE FOR INVENTION

Hereinafter, with reference to the attached drawings, a cam apparatus of a portable sublimation printer according to preferred embodiments of the present invention will be described in detail.

Figure 2:
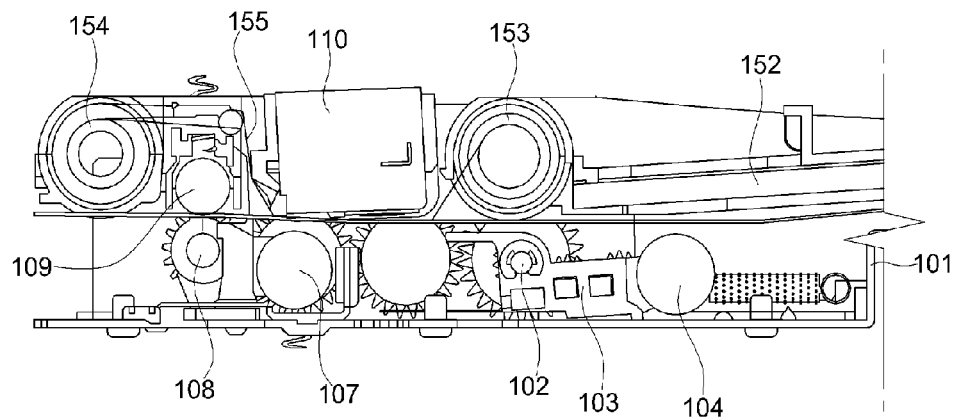
FIG. 2 is a cross-sectional view for illustrating a cross section of the sublimation printer.
Figure 3:
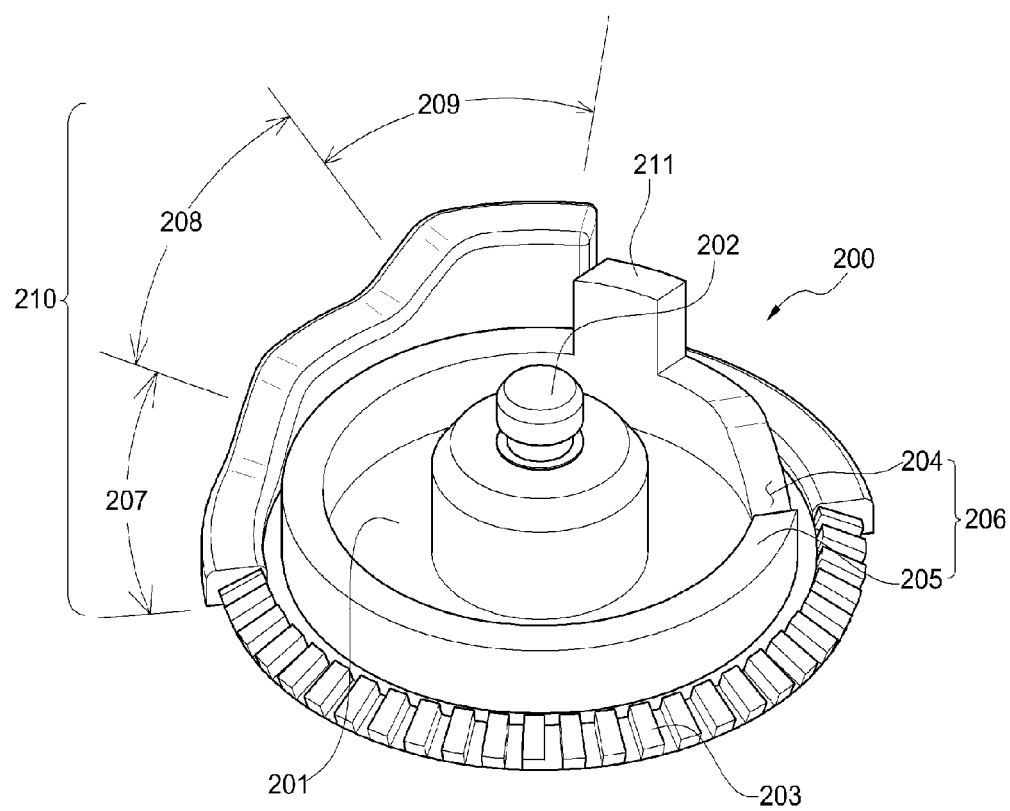
FIG. 3 is a perspective view for illustrating a cam according to the present invention.
Figure 4:
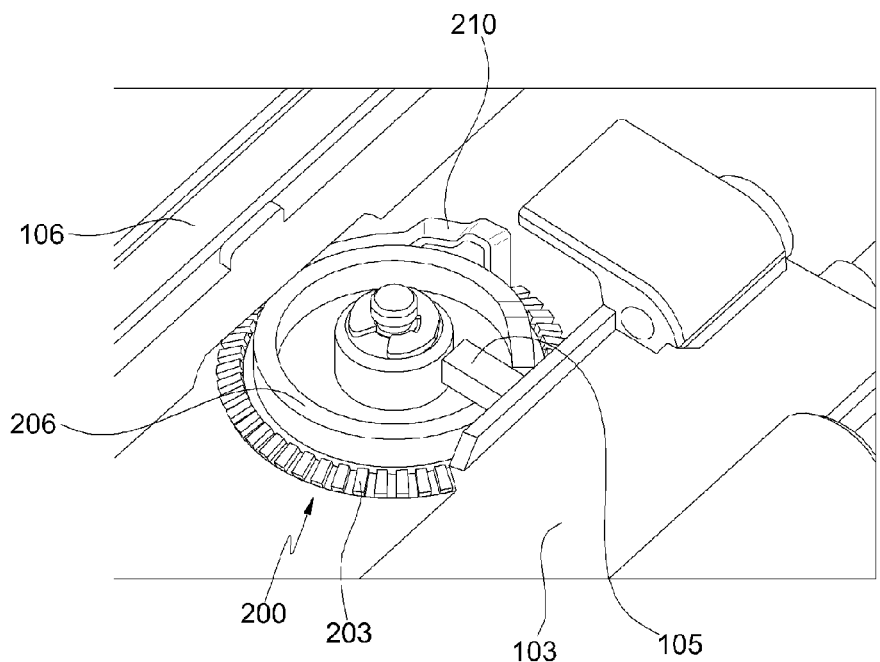
FIG. 4 is a perspective view for illustrating a state, in which a platen bracket is positioned at a platen initial section of a platen cam.
Figure 5:
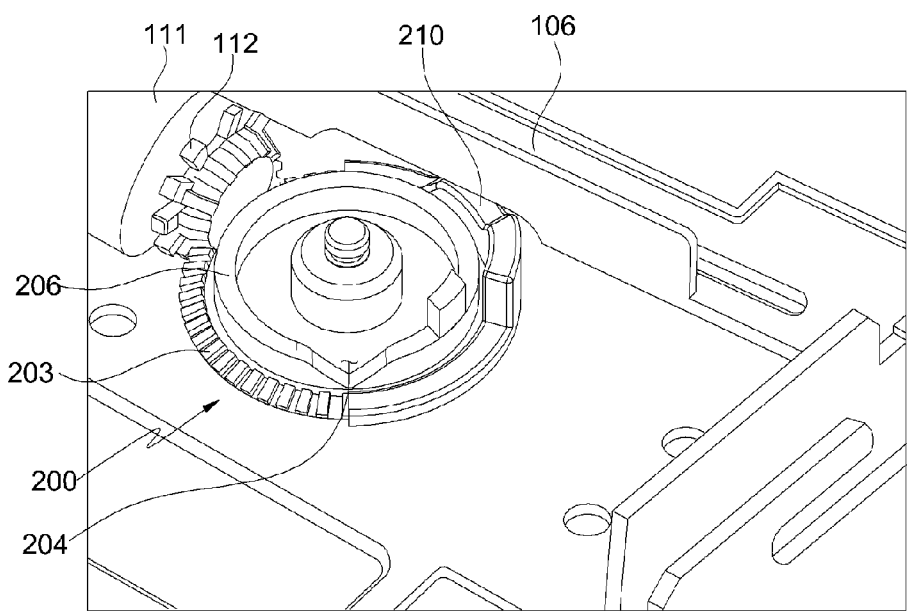
FIG. 5 is a perspective view for illustrating a state, in which the platen bracket is positioned at a platen half-up section of the platen cam.
Figure 6:
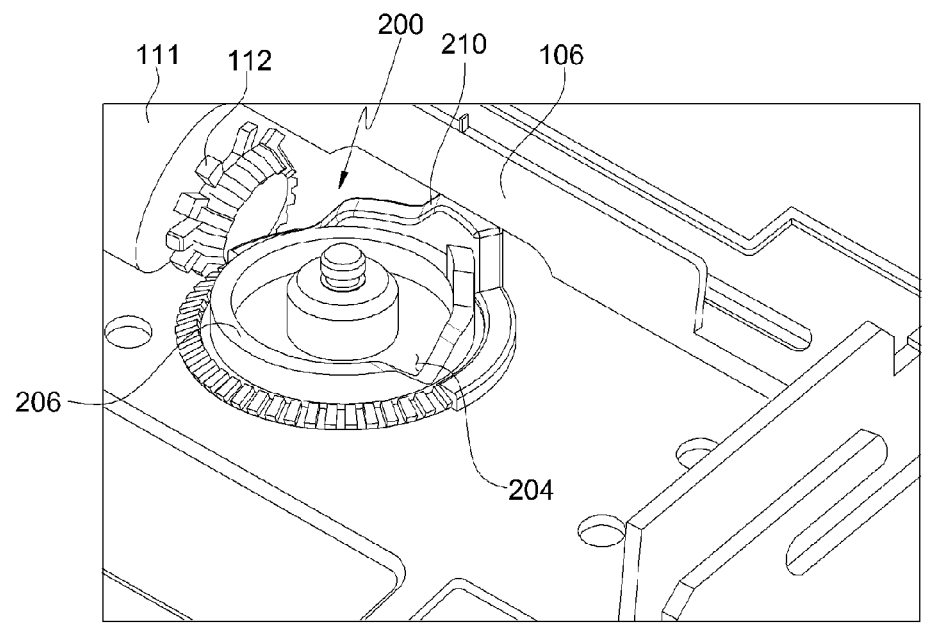
FIG. 6 is a perspective view for illustrating a state, in which the platen bracket is positioned at a platen full-up section of the platen cam.
Figure 7:
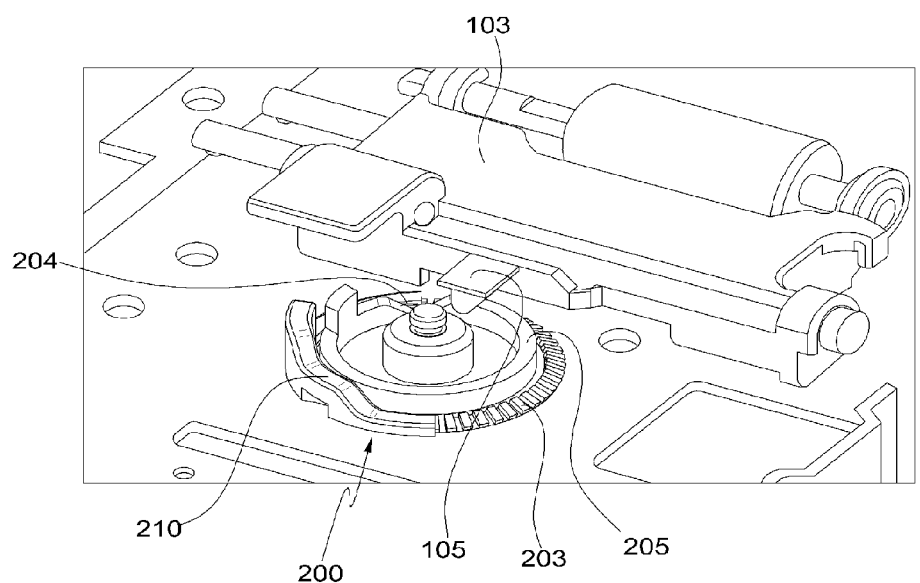
FIG. 7 is a perspective view for illustrating a state, in which a pickup roller bracket guide is positioned at a pickup roller descending part of a pickup roller cam.
Figure 8:
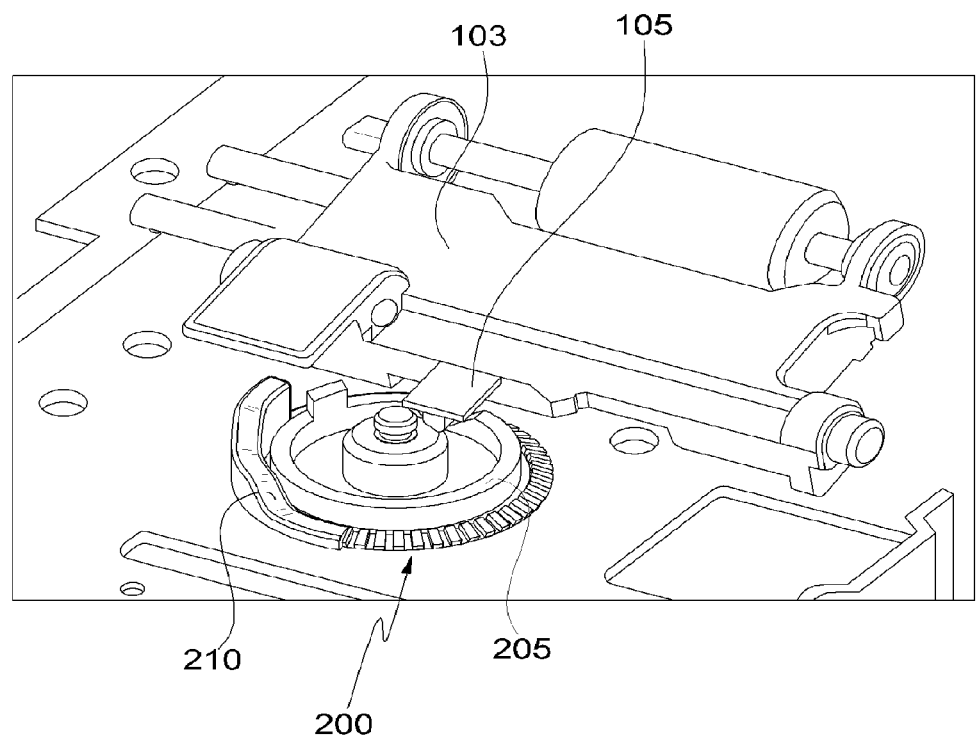
FIG. 8 is a perspective view for illustrating a state, in which the pickup roller bracket guide is positioned at a pickup roller ascending part of the pickup roller cam.

FIG. 1 is a perspective view for illustrating a cartridge mounted on a sublimation printer, FIG. 2 is a cross-sectional view for illustrating a cross section of the sublimation printer, FIG. 3 is a perspective view for illustrating a cam according to the present invention, FIG. 4 is a perspective view for illustrating a state, in which a platen bracket is positioned at a platen initial section of a platen cam, FIG. 5 is a perspective view for illustrating a state, in which the platen bracket is positioned at a platen half-up section of the platen cam, FIG. 6 is a perspective view for illustrating a state, in which the platen bracket is positioned at a platen full-up section of the platen cam, FIG. 7 is a perspective view for illustrating a state, in which a pickup roller bracket guide is positioned at a pickup roller descending part of a pickup roller cam, and FIG. 8 is a perspective view for illustrating a state, in which the pickup roller bracket guide is positioned at a pickup roller ascending part of the pickup roller cam.

A cam device, according to the present invention, is to be mounted on the inside of a portable sublimation printer. Therefore, in order to form thin and lightweight printer, as shown in FIG. 1, a cartridge 150 is formed to be thin and a printing paper 152 and a ribbon 155 are received in the cartridge 150 such that the cartridge 150 is formed in an integration shape.

As the cartridge 150 formed as above is provided to a printer, a thermal recording head 110 is positioned between a winding reel 154 and a supply reel 153, supplying the ribbon 155, and thus the ribbon 155 is positioned at the lower portion of the thermal recording head 110, as shown in FIG. 2.

In this state, if the printing paper 152 is supplied such that the printing paper 152 is positioned at the lower portion of the thermal recording head 110, the heat generated by the thermal recording head 110 is instantly applied to the ribbon 155 such that a printing dye immediately sublimates from a solid state into a gas state by the heat and the sublimated dye is cooled and stuck on the printing paper 152, carrying out printing.

Simply explaining the printing process, referring to FIG. 2, a pickup roller bracket 103 rotates with respect to a shaft 102 such that a paper pickup roller 104 comes into contact with the printing paper 152, which is received in a paper receiving case 151 of the cartridge and positioned at the lowermost end, thereby transferring the printing paper 152 to the thermal recording head 110.

The printing paper 152 is completely transferred until the right end portion of the printing paper 152 passes the thermal recording head 110 by a capstan 108 and a pinch roller 109, and then supplied to the thermal recording head 110 by the capstan 108 and the pinch roller 109. If the printing paper 152 reaches the thermal recording head 110, the platen 107 is lifted so as to bring the printing paper 152 into contact with the thermal recording head 110 and the ribbon 155, and then the printing is carried out.

As described hereinabove, in the process of transferring and printing the printing paper 152, each of the platen 107 and the paper pickup roller 104 carries out the up/down operations thereof in association with each other. Herein, a cam device according to the present invention is derived to realize the up/down operations of the platen 107 and the pickup roller 104 by using a single cam.

Referring to FIG. 3, a cam 200 according to the present invention includes a body 201 formed in a circular plate shape, a gear 203 formed on the outer side end of the upper surface of the body 201, which is formed in a circular plate shape, wherein the gear 203 is formed in the shape of a bevel gear in the range of a semicircle, that is, in the range of about 180° of the body 201, a platen cam 210 formed to be protruded upwardly on the remaining portion of the outer side end of the upper surface of the body 201, on which the gear 203 is not formed, and a pickup roller cam 206 formed to be protruded upwardly at a predetermined distance from the inside of the platen cam 210.

The platen cam 210 of the cam 200 is to move the platen 107, as shown in FIG. 2, in the up/down direction, and formed on the outer side of the upper portion of the cam 200 in the range of about 180°, as shown in FIG. 3. Further, the platen cam 210 includes a platen initial section 207, a platen half-up section 208 and a platen full-up section 209, wherein the height of the platen cam 210 is the lowest in the platen initial section 207 and is gradually increased towards the platen full-up section 209 through the platen half-up section 208 such that the platen cam 210 can carry out the up/down operations of the platen in three levels.

Meanwhile, the platen initial section 207 of the platen cam 210 corresponds to the completely lowered position of the platen 107 of FIG. 2, the platen half-up section 208 is a section for lifting the platen 107 before the platen 107 makes the printing paper 152 into contact with the thermal recording head 110, and the platen full-up section 209 is a section for completely lifting the platen 207 of FIG. 2 such that the printing paper 152 comes into contact with the thermal recording head 110.

The platen cam 210 as described above is formed on the outer side end of the upper portion of the cam 200 in the range of about 180°, wherein the remaining portion on the outer side end of the upper portion of the cam 200 is provided with the gear 203 in shape of a bevel gear.

According to the embodiment of the present invention as described above, the plate cam 210 and the gear 203 are respectively formed on the outer side end of the upper portion of the cam 200 by dividing the outer side end of the upper portion of the cam 200. However, it is also possible to form the platen cam 210 in any other shape, and thus it is possible to form the gear 203 in the shape of a bevel gear in the range of 360° on the outer side of the upper portion of the cam 200 and form the cam 200 inside the gear 203 so as to be spaced from the gear 203 at a predetermined distance toward the center direction of the cam 200.

The pickup roller cam 206 is formed inside the platen cam 210 of the cam 200 and spaced from the platen cam 210 at a predetermined distance.

According to the embodiment of the present invention as described above, the pickup roller cam 206 is formed inside the platen cam 210 of the cam 200 and spaced from the platen cam 210 at a predetermined distance. However, it is also possible to form the platen cam 210 and the pickup roller cam 206 on the same diameter portion.

The pickup roller cam 206 includes a pickup roller descending part 205, which is protruded upwardly from the body 201 of the cam 200 and formed in the shape of a ring, and a pickup roller ascending part 204, which is formed in the shape of a "V"-shaped groove at a part of the pickup roller descending part 205, as shown in FIG. 3.

The pickup roller cam 206 moves the paper pickup roller 104 of FIG. 2 in the up/down directions such that the printing paper 152 received in the cartridge 150 can be withdrawn.

The pickup roller ascending part 204 is formed on a portion, which faces the platen initial section 207 of the platen cam 210 with respect to the cam shaft 202.

According to the cam 200 constructed as above, the bottom surface of the platen bracket 106, which supports the plate 107, comes into contact with the platen cam 210 portion of the cam 200 and the bottom surface of a guide 105 of the pickup roller bracket 103, which supports the paper pickup roller 104, comes into contact with the pickup roller cam 206 portion of the cam 200, as shown in FIG. 4.

It is preferable that the bottom surface of the guide 105, which comes into contact with the pickup roller cam 206, is formed in the shape of an arc so as to smoothly move through the pickup roller ascending part 204, which is formed in the shape of a "V".

Further, the gear 203 of the cam 200 is engaged with a gear (not shown) which is formed in the shape of a bevel gear and coupled to the motor shaft of the geared motor 111 such that the cam 200 rotates with respect to the cam shaft 202 by the operation of the geared motor 111, as shown in FIG. 5.

FIG. 4 shows an initial state of a printer, in which the bottom surface of the platen bracket 106 is in contact with the platen initial section 207 of the platen cam 210 such that the platen 107 of FIG. 2 is completely lowered, and FIG. 7 shows a state, in which the guide 105 of the pickup roller bracket 103 is in contact with the pickup roller descending part 205 of the pickup roller cam 206 (the platen bracket is omitted in FIG. 7).

If the geared motor 111 drives the cam 200 so as to rotate the cam 200 according to a print command, the cam 200 rotates in the counterclockwise direction such that the platen bracket 106 comes into contact with the platen half-up section 208 of the platen cam 210 and thus the platen 107 is lifted, as shown in FIG. 5.

Herein, the guide 105 of the pickup roller bracket 103 is inserted into the pickup roller ascending part 204 of the pickup roller cam 206, as shown in FIG. 8, such that the paper pickup roller 104 in FIG. 2 is lifted so as to withdraw the printing paper 152 from the cartridge. Then, the guide 105 comes into contact with the pickup roller descending part 205 of the pickup roller cam 206 again such that the paper pickup roller 104 is lowered.

In addition, as the cam 200 is driven by the geared motor 111 and thus rotates, the platen bracket 106 comes into contact with the platen full-up section 209 of the platen cam 210 such that the platen 107 of FIG. 2 is completely lifted so as to bring the printing paper 152 into contact with the thermal recording head 110.

As the printing is finished, the geared motor 111 rotates in the backward direction and rotates the cam 200 in the clockwise direction such that the platen bracket 106 comes into contact with the platen half-up section 208 or the platen initial section 207.

The geared motor 111 includes a reducer, which is formed therein, and the motor shaft includes a rotation amount recognition code 112, which is formed in the shape of a concave and convex part so as to be sensed by a detection sensor (not shown) such that a shaft rotation amount can be detected and the rotation amount of the cam 200 can be controlled.

Figure 9:
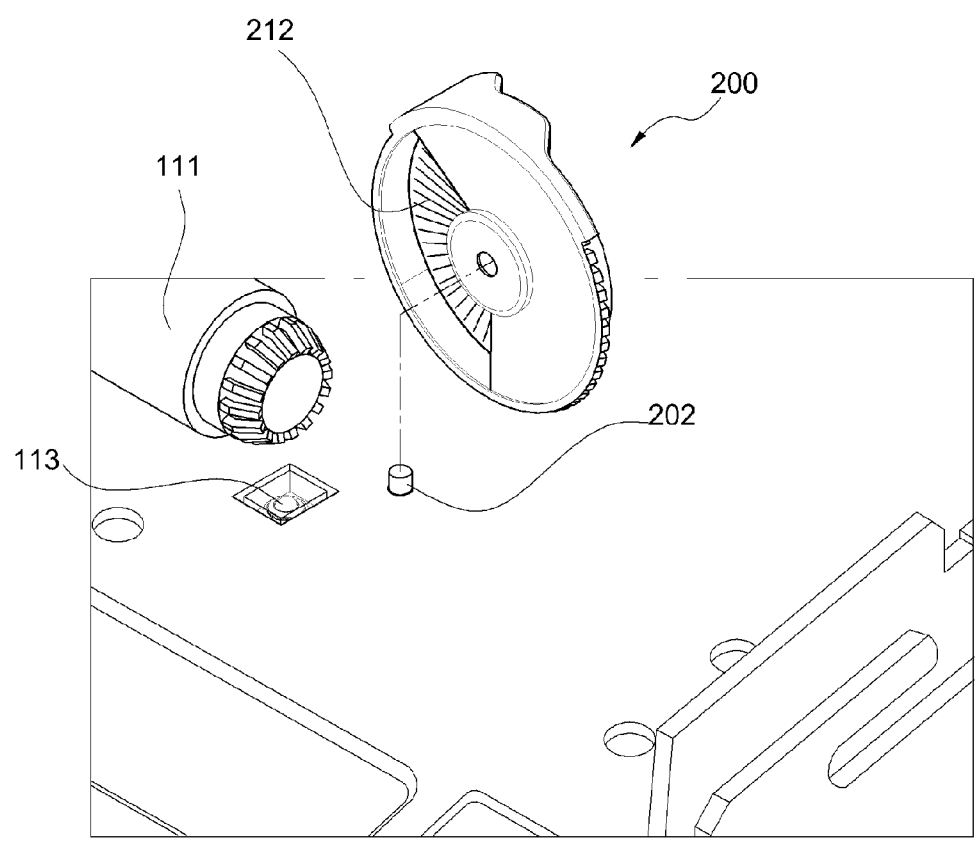
FIG. 9 is a view for illustrating a state, in which a rotation amount recognition code is formed at the lower portion of a cam.

According to another embodiment of the present invention, as shown in FIG. 9, the cam 200 may include a rotation amount recognition code 212, which is formed on the bottom surface of the cam 200, and a sensor 113, which is mounted on the bottom surface frame of the cam 200, such that the rotation amount of the cam 200 can be controlled.

In addition, it is also possible that the cam 200 includes a rotation amount recognition code provided to a side surface thereof and a sensor provided at the corresponding position thereof so as to control the rotation amount of the cam, even though they are not shown in the drawings.

According to the cam of the present invention as described above, the body 201 of the cam 200 is formed in a circular plate shape and the platen cam 210 and the pickup roller cam 206 are formed to be protruded upwards on the body 201 of the cam 200 such that the cam lifts the platen bracket 106 and the paper pickup roller bracket 103 in a state, in which the bottom surface of the cam 200 is in contact with the frame 101 of the printer of FIG. 2.

Meanwhile, the geared motor 111 for driving the cam 200 can carry out the bevel gear engagement with the gear 203 of the cam 200.

Therefore, a vertical load transmitted to the platen cam 210 and the pickup roller cam 206 is dispersed and transmitted to the frame 101 of the printer through the body 201 of the cam, such that the cam 200 can stably carry out the operations. In addition, the load is not transmitted to the geared motor 111 such that a motor of a small capacity can be selected and used. Therefore, the miniaturization and weight lightening of the printer can be realized.

The cam device according to the present invention constructed as above can control the up/down operations of the platen roller and the up/down operations of the paper pickup roller by a single cam, and stably drive the cam 200 by dispersing the load applied to the cam to the frame 101 of the printer. Therefore, a small-sized motor can be provided to a side surface of the cam and thus the miniaturization and weight lightening of the printer can be realized.

Hereinabove, the cam apparatus of a portable sublimation printer according to the present invention has been described.

In the meantime, it should be understood that the technical features of the present invention may be embodied in any other specific forms by a person skilled in the art, to which the present invention belongs, without departing from the technical idea and scope of the present invention.

As described above, while the present invention has been particularly shown and described with reference to the example embodiments thereof, it will be understood by those of ordinary skill in the art that the above embodiments of the present invention are all exemplified and various changes, modifications and equivalents may be made therein without changing the essential characteristics and scope of the present invention. Therefore, it would be understood that the present invention is not limited to the forms described in the example embodiments and the technical and protective scope of the present invention shall be defined by the following claims. In addition, it should be also understood that all modifications, changes and equivalences within the technical scope of the present invention defined by the following claims belong to the technical scope of the present invention.

What is claimed is:

1. A cam apparatus of a portable sublimation printer, comprising:
    a body formed in a circular plate shape and coupled to a cam shaft on an inner surface of a frame of a printer to make contact with the frame;
    a gear formed on an outer side of the upper surface of the body, which is formed in a circular plate shape;
    a platen cam upwardly protruding from the upper surface of the body, which is formed in a circular plate shape, and making contact with a platen bracket to move up and down the platen bracket;
    a pickup roller cam upwardly protruding from the upper surface of the body, which is formed in a circular plate shape, and moving a pickup roller bracket in the up and down directions; and
    a geared motor engaged with a gear of a cam at one side of the cam to drive the cam.

2. The cam apparatus of a portable sublimation printer according to claim 1, wherein the gear formed on the outer side end of the cam body is formed in the shape of a bevel gear and the geared motor has a gear formed in the shape of a bevel gear such that the gear of the geared motor is engaged with the gear of the cam.

3. The cam apparatus of a portable sublimation printer according to claim 1, wherein the gear is formed on the outer side end of the body in the range of a semicircle with respect to the cam shaft, and the platen cam is formed on the remaining portion of the outer side end of the body, on which the gear is not formed.

4. The cam apparatus of a portable sublimation printer according to claim 3, wherein the platen cam is formed of three-level height, in which the height gradually increases in the sequence of a platen initial section, a platen half-up section and a platen full-up section.

5. The cam apparatus of a portable sublimation printer according to claim 3, wherein the pickup roller cam has a pickup roller descending part, which is protruded upwardly from the body of the cam, and a pickup roller ascending part, which is formed in the shape of a "V"-shaped groove on the pickup roller descending part.

6. The cam apparatus of a portable sublimation printer according to claim 1, wherein the platen cam is formed of three-level height, in which the height gradually increases in the sequence of a platen initial section, a platen half-up section and a platen full-up section.

7. The cam apparatus of a portable sublimation printer according to claim 1, wherein the pickup roller cam has a pickup roller descending part, which is protruded upwardly from the body of the cam, and a pickup roller ascending part, which is formed in the shape of a "V"-shaped groove on the pickup roller descending part.

8. The cam apparatus of a portable sublimation printer according to claim 7, wherein the pickup roller bracket has a guide, which is formed to be protruded in the cam direction, and the guide has a bottom surface formed in an arc shape.

9. The cam apparatus of a portable sublimation printer according to claim 7, wherein the pickup roller ascending part is formed on a portion, which faces the platen initial section of the platen cam with respect to the cam shaft.

10. The cam apparatus of a portable sublimation printer according to claim 1, wherein the geared motor incorporates a reducer.

11. The cam apparatus of a portable sublimation printer according to claim 1, wherein the geared motor has a rotation amount recognition code.

12. The cam apparatus of a portable sublimation printer according to claim 1, wherein the body has a rotation amount recognition code, which is formed on the outer surface of the body, to measure a cam rotation amount by a sensor.

13. A cam apparatus of a portable sublimation printer, comprising:
- a body formed in a circular plate shape;
- a gear formed on an outer side of the upper surface of the body, which is formed in a circular plate shape;
- a platen cam upwardly protruding from the upper surface of the body, which is formed in a circular plate shape; and
- a pickup roller cam upwardly protruding from an upper surface of the body, which is formed in a circular plate shape.

* * * * *